Figure 1:
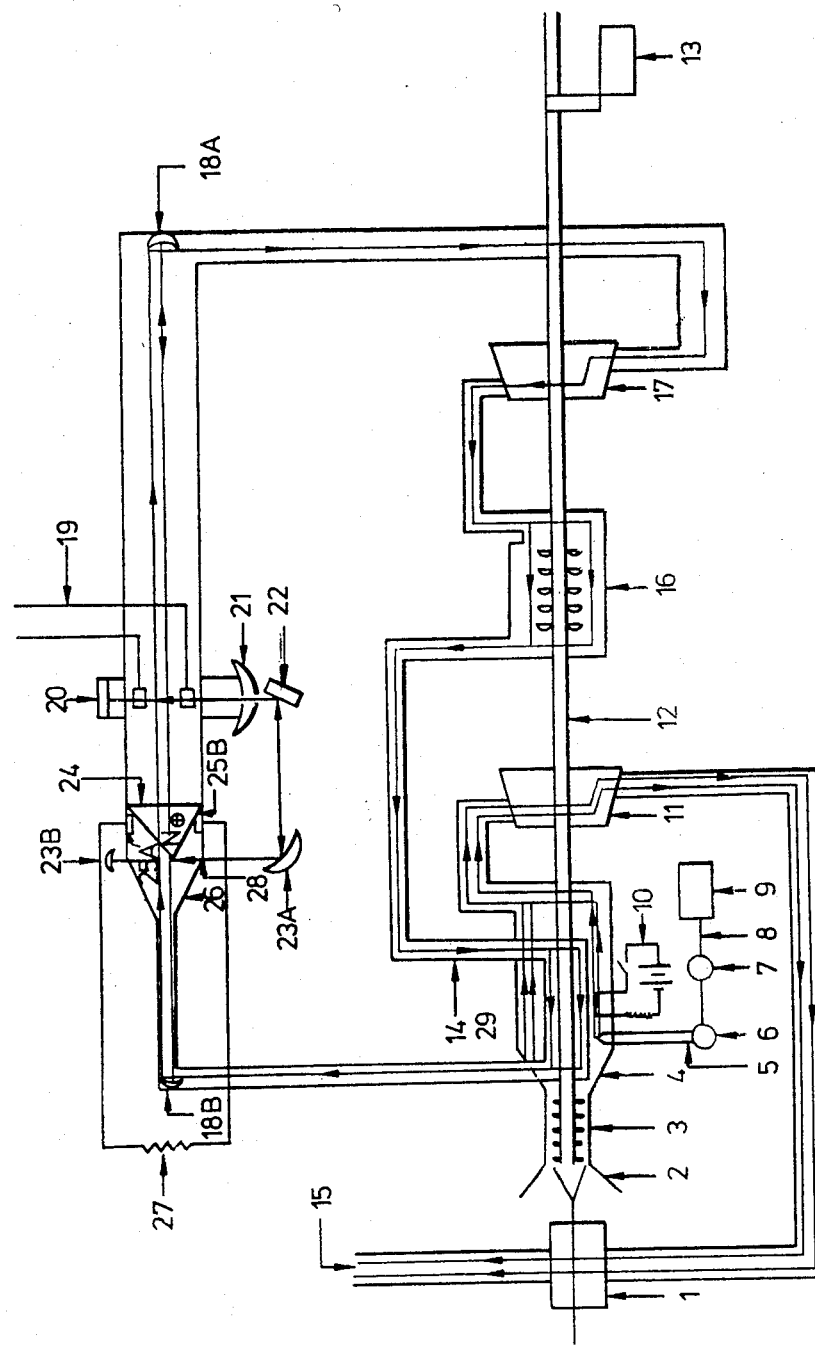

United States Patent [19]

Hayes

[11] Patent Number: 4,500,803
[45] Date of Patent: Feb. 19, 1985

[54] SELF INDUCED LASER MAGNETOHYDRODYNAMIC (MHD) ELECTRIC GENERATOR

[76] Inventor: James C. Hayes, 1900 Lincoln Apt. 62, Montreal, Quebec, Canada, H3H 1H7

[21] Appl. No.: 417,886

[22] Filed: Sep. 14, 1982

[30] Foreign Application Priority Data

Sep. 23, 1981 [CA] Canada .................. 393713

[51] Int. Cl.³ .............................. H02N 4/02
[52] U.S. Cl. ........................ 310/11; 372/90
[58] Field of Search ............ 310/11; 372/90, 82

[56] References Cited

U.S. PATENT DOCUMENTS

| | | | |
|---|---|---|---|
| 3,319,090 | 5/1967 | Dzung | 310/11 |
| 3,354,328 | 11/1967 | Maitland | 310/11 |
| 3,418,206 | 12/1968 | Hall et al. | 310/11 X |
| 3,436,918 | 4/1969 | Brogan et al. | 310/11 X |
| 3,480,806 | 11/1969 | Berberick | 310/11 |
| 3,702,973 | 11/1972 | Daugherty et al. | 310/11 X |
| 3,706,050 | 12/1972 | Cason | 372/90 |
| 3,748,505 | 7/1973 | Lavarini | 310/11 |
| 3,906,398 | 9/1975 | Russell et al. | 310/11 X |
| 4,134,034 | 1/1979 | Dardai et al. | 310/11 |
| 4,275,318 | 6/1981 | Duncan | 310/11 |

FOREIGN PATENT DOCUMENTS

79/01086 12/1979 European Pat. Off.
1066547 4/1967 United Kingdom.

Primary Examiner—Donovan F. Duggan
Attorney, Agent, or Firm—Keil & Weinkauf

[57] ABSTRACT

A laser-induced magnetohydrodynamic (MHD) electric generator, in which the working gas medium is the gas of a gas laser. The coherent light generated by this gas laser is used for ionizing the gas medium circulated in closed cycle by a compressor through the magnetic gap of the generator, to produce electricity. This MHD generator can be combined with a fuel engine to convert the thermal energy of fuel and/or the thermal energy stored in air into electrical energy by magnetohydrodynamic action. The fuel engine may comprise a combustion chamber in which fuel is burnt with air, an heat-exchanger in which the thermal energy from the burner is transferred in part to the gas medium of the closed cycle, and at least one heat engine, preferably a turbine, in which the remaining part of the thermal energy from the burner is used to run the compressor used in the closed cycle to circulate the gas medium through the magnetohydrodynamic generator. The so obtained hybrid engine is particularly interesting because of its high thermodynamic efficiency and its high energy conversion rate.

11 Claims, 2 Drawing Figures

SELF INDUCED LASER MAGNETOHYDRODYNAMIC (MHD) ELECTRIC GENERATOR

The present invention relates to an improved, magnetohydrodynamic (MHD) electric generator and to its use in a hybrid engine for converting the thermal energy of fuel and/or the thermal energy stored in air into electrical energy with a high thermodynamic efficiency and a high rate of energy conversion.

MHD generators are known machines wherein electricity is produced by passing an ionized gas across a magnetic field. In practice, this kind of machines can only be efficient if the electron concentration in the gas is raised to a level at which the conductivity is adequate. This is usually obtained by heating the gas to a high temperature and seeding it with alkali metals or with other ionizing elements. This heating which is necessary to ionize the gas to a sufficient extent, is in practice one of the main problems of the known MHD generators, since it makes the gas very difficult to work with.

A first object of the present invention is to provide an improved, MHD electric generator, in which the working gas medium is photoionized by a laser light.

Another object of the invention is to provide an improved MHD electric generator of the above mentioned type, wherein the working gas medium is the gas of a gas laser and is used both for generating electricity and generating the laser light.

A further object of the invention is to provide a hybrid engine incorporating an improved, MHD electric generator of the above mentioned type, together with a conventional fuel engine, for converting the thermal energy of fuel and/or the thermal energy stored in air into electrical energy with a high thermodynamic efficiency and a high rate of energy conversion.

The improved magneto-hydrodynamic electric generator according to the invention is of the type comprising an ionized gas flowing through a magnetic field to produce electricity between a pair of electrodes perpendicular to the flow of gas and to the magnetic field. This MHD generator is improved in that the flow of gas is photoionized by means of a laser light generated by a laser light source.

Advantageously, the laser light source may be a gas-laser and the gas of said gas-laser is the gas flowing preferably in closed cycle through the magnetic field of the generator.

The gas-laser of the MHD generator according to the invention, may comprise a divergent nozzle to make the gas to laser by expansion and/or a radio frequency generator to make the gas to laser by electric stimulation. In both cases, an optical system is provided for collecting the laser light and focusing it on the flow of gas upstream the electrodes and magnetic field, this optical system may comprise a first pair of mirrors upstream and downstream the gas flow respectively, for focusing the laser light in the axial direction of the gas flow, an optical sub-system for collecting the laser light in a direction transversal to the gas flow and another pair of focusing mirrors for focusing the laser light collected by the sub-system in a direction transversal to the gas flow.

The MHD generator according to the invention may also comprise a heat-exchanger for heating the gas prior to passing through the electrodes and a compressor for circulating the gas through the closed cycle.

As aforesaid, the improved MHD generator according to the invention can be combined with a conventional, open-cycle fuel engine to give a hybrid engine for converting the thermal energy of fuel and/or the thermal energy stored in air into electrical energy with a high thermodynamic efficiency and a high rate of energy conversion. In this particular combination, the open-cycle fuel engine comprises in series a combustion chamber through which air and fuel are burnt, the heat-exchanger of the MHD generator and a heat-engine for operating the compressor of the MHD generator.

Figure 2:
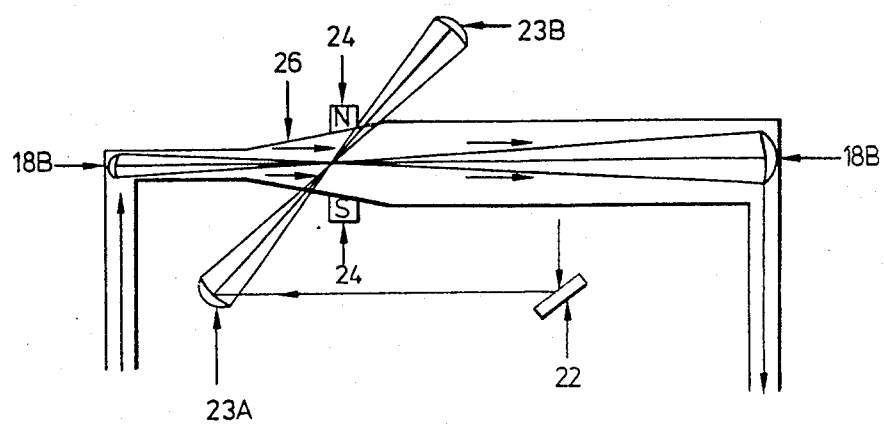

The invention will be better understood with reference to the following non-restrictive description of a preferred embodiment thereof, taken in connection with the accompanying drawings in which:

FIG. 1 is a diagrammatic representation of a hybrid engine incorporating a laser-induced, magnetohydrodynamic generator according to the invention in combination with a fuel engine; and FIG. 2 is a diagrammatic representation of the magnetic cap and focusing system of the MHD generator shown in FIG. 1.

Referring to FIGS. 1 and 2, the laser-induced, magnetohydrodynamic (MHG) generator according to the invention, is of the closed-cycle type and comprises a sealed duct 14 filled with a gas laser, gas mixture such as Hg-Krypton, Cs—He, $CO_2$—$N_2$—He with $H_2$, and the like. This gas mixture which forms the working gas medium of the MHD generator, is circulated through the duct 14 by means of a compressor 16 run by an external power source as will be described hereinafter, and passes through a heat engine 17 forming part of the closed cycle. The heat engine 17 which may be a turbine or a sterling engine mounted onto the duct 14 upstream the compressor 16, is used for recovering as much energy as possible from the generator, and transmits its power to the compressor 16 via a driving shaft 12.

The gas mixture circulated by the compressor 16 passes through a heat exchanger 29 that can be located indifferently upstream or downstream the compressor. In FIG. 1 the heat exchanger 29 is located downstream the compressor.

After heating, the gas mixture passes through a divergent nozzle 26. The gas expanding through the nozzle 26 is made to laser by expansion. This gas may also be made to laser by electrical stimulation through radio frequency (RF) induction via a RF generator 19 connected to a ring laser cavity, a curved mirror cavity or a hole couple cavity. The coherent light generated in the axial and/or transverse directions according to the selected direction of induction is collected in the axial direction, i.e. in the direction of the gas flow, by a pair of focusing mirror 18 A and 18 B, and in transversal direction by a conventional, transverse mode output consisting of an optical system comprising a plain mirror 20 facing a spherical brewster glass, gap mirror 21 acting as laser output and microwave adjuster.

The mirror 18 A and 18 B are positioned and adjusted to focus the coherent light that they collect between a pair of permanent magnets 24 of triangular shape, in the gap of which the circulating gas flows. The coherent light collected at the output of the gap mirror 21 is also fed back and transversally focuses via a plain mirror 22, a pair of spherical focusing mirror 23 A and 23 B and a window 28, between the magnets 24. All the coherent light which is so collected and focused in the gap formed between the permanent magnets 24, ionizes the gas passing through this gap. The ionization of the gas passing between the magnets 14 results in turn in the generation of electricity by conventional magnetohydrodynamic action and the generated current is collected and supplied to a load 27 via a pair of electrodes 25 A and 25 B perpendicular to both the gas flow and the magnets 14. It should be noted that carbon soot may be seeded in the gas medium to enhance ionization of the gas medium, between the generator gap.

The high temperature of the generated and collected laser light ensures ionization of the gas in the MHD generator gap without necessity of heating this gas at a very high temperature by means of an external source. Moreover, as the gas circulates in a closed cycle, the thermodynamical efficiency of the generator is very good as compared to the known results obtained with the known generators.

As aforesaid, the gas is circulated through the duct 14 of the generator via a compressor 16 run by an external power source.

According to another aspect of the invention, the external power source may advantageously consist of a fuel engine using the thermal energy of fuel and/or air in an open cycle as source of power for the compressor 16 and as source of heat for the heat exchanger 29.

Referring again to FIG. 1, the open-cycle fuel engine comprises an air intake 2 through which air is brought in from the exterior. This air may already have thermal energy stored in it from a solar collector, a wind collector or both of them. However, it may also just be ordinary air.

This air is sent through a compressor 3 into a combustion chamber 4, in which it is burnt with fuel if the air does not have enough stored energy. The combustion chamber 4 is connected to, or incorporates, the heat exchange 29 in which the gas medium of the closed cycle is heated. The fuel is fed to the chamber 4 from a storage tank 9 via a fuel line 8, a variable fuel pump 7, a throttle valve 6 and a burner nozzle 5, and the burner is started by an electric spark circuit 10. The hot combustion gas and/or air leaving the chamber 4 are fed to a heat engine 11 which may consist of a turbine or a sterling engine, in order to extract energy to run the compressor 3. The extracted energy is also used to run the compressor 16 of the closed cycle.

It should be noted that when turbines are used as heat engines, all the compressors and turbines can advantageously be mounted on the same axis 12 as shown in FIG. 1 and both cycles can be started simultaneously by a starting motor 13 also mounted on the same axis 12. It should also be noted that the exhaust gases and/or air from the heat engine 11 can also be used to heat the incoming air of the cycle through an additional heat exchanger 1 in order to enhance again the efficiency of the engine.

The above described engine is very efficient to convert the thermal energy of fuel and/or the thermal energy stored in air into electrical energy. As the temperature of the laser light is high as compared to the exhaust temperature, its thermodynamic efficiency is high.

Moreover, as fuel is burned in an external combustion chamber, the temperature and pressure of the engine may be controlled. Thus, pollution can also be controlled and reduced. Any reasonable fuel may be used, even powder coal.

The above described engine is easily scalable. Therefore, it can output power from watts to megawatts.

The use of a gas medium makes it easy to handle the engine, since this gas is used in a closed cycle over and over again, the engine can be made portable in, for example, a car, plane, boat, truck and the like.

Of course, various changes may be made in the shape, size, and arrangement of the engine parts. For example, equivalent elements may be susbstituted for those illustrated and described herein and parts may be reversed. Moreover, certain features of the invention may be utilized independently of the use of other features all without departing from the spirit or scope of the invention as defined in the subjoining claims.

The embodiments of the invention in which an exclusive property or privilege is claimed are defined as follows:

1. In a magneto-hydrodynamic electric generator of the type comprising:
a laser light source generating a laser light capable of photo-ionizing a gas;
means for passing said photo-ionized gas through a magnetic field to produce electricity between a pair of electrodes perpendicular to the flow of gas and to the magnetic field, and
means for recycling the gas having passed through the magnetic field, thereby making said gas to flow through the generator in a closed cycle,
the improvement:
wherein the MHD generator further comprises a heat-exchanger for heating the gas prior to passing through the electrodes, and a compressor for circulating the gas through the closed cycle;
wherein the laser light source is a gas laser;
wherein the gas of said gas laser is the one flowing through the generator and its magnetic field; and
wherein said gas laser comprises a divergent nozzle forming part of the closed cycle to make the gas passing therethrough to laser by expansion, a radio frequency generator to make the gas to laser by electric stimulation, and an optical system for collecting the laser light and focusing it onto the flow of gas upstream the electrodes and magnet field, said optical system including a first pair of mirrors upstream and downstream the gas flow respectively, for focusing the laser light in the axial direction of the gas flow, an optical sub-system for collecting the laser light in a direction transversal to the gas flow and another pair of focusing mirrors for focusing the laser light collected by the sub-system in a direction transversal to the gas flow.

2. The improved, MHD generator of claim 1, further comprising a heat engine for recovering energy from the gas and supplying the so recovered energy to the compressor.

3. The improved, MHD generator of claim 1, wherein the gas is a mixture of a gas selected from the group consisting of Hg—Kr, Cs—He and $CO_2$—$N_2$—He with $H_2$.

4. A hybrid engine for converting the thermal energy of fuel and/or the thermal energy stored in air into electrical energy with a high thermodynamic efficiency and a high rate of energy conversion, comprising in combination:
an improved MHD electric generator of the type comprising an ionized gas flowing through a magnetic field to product electricity between a pair of electrodes perpendicular to the flow of gas and to the magnetic field, said flow of gas being photoionized by means of a laser light generated by a laser light source, said laser light source being a gas-laser, the gas of said gas laser being also the gas flowing through the magnetic field of the generator, said gas also flowing through the generator in a closed cycle, said generator further comprising a heat-exchanger for heating the gas prior to passing through the electrodes, and a compressor for circulating the gas through the closed cycle, and an open-cycle fuel engine comprising, in series, a combustion chamber through which air and fuel are burnt, the heat-exchanger of the MHD generator and a heat-engine for operating the compressor of the MHD generator.

5. The hybrid engine of claim 4, wherein the fuel engine further comprises an air compressor also operated by the heat engine for compressing the air fed to the combustion chamber.

6. The hybrid engine of claim 5, wherein the heat engine is a turbine and this turbine, the air compressor and the gas compressor of the MHD generator are mounted on a same shaft.

7. The hybrid engine of claim 6, wherein the MHD generator also comprises a turbine for recovering energy from the gas and supplying the so recovered energy to the gas compressor of the MHD generator, said turbine being mounted on the same shaft as said gas compressor.

8. The hybrid engine of claim 12, wherein the gas laser of the MHD generator comprises a divergent nozzle to make the gas to laser by expansion, a radio frequency generator to make the gas to laser by electric stimulation, and an optical system for collecting the laser light and focusing it on the flow of gas upstream the electrodes and magnetic field, said system comprising a first pair of mirrors upstream and downstream the gas flow respectively, for focusing the laser light in the axial direction of the gas flow, an optical sub-system for collecting the laser light in a direction transversal to the gas flow and another pair of focusing mirrors for focusing the laser light collected by the sub-system in a direction transversal to the gas flow.

9. The hybrid engine of claim 8, wherein the gas of the MHD generator is a mixture of a gas selected from the group consisting of Hg—Kr Cs—He and $CO_2$—$N_2$—He with $H_2$.

10. The hybrid engine of claim 7, wherein the gas laser of the MHD generator comprises a divergent nozzle to make the gas to laser by expansion and an optical system for collecting the laser light and focusing it onto the flow of gas upstream the electrodes and magnetic field.

11. The hybrid engine of claim 7, wherein the gas laser of the MHD generator comprises a radio frequency generator to make the gas to laser by electric stimulation, and an optical system for collecting the laser light, said optical system comprises a first pair of mirrors upstream and downstream the gas flow respectively for focusing the laser light in the axial direction of the gas flow, an optical sub-system for collecting the laser light in a direction transversal to the gas flow and another pair of focusing mirrors for focusing the laser light collected by the sub-system in a direction transversal to the gas flow.

* * * * *